US010537872B1

(12) United States Patent
Saha

(10) Patent No.: US 10,537,872 B1
(45) Date of Patent: Jan. 21, 2020

(54) SORBENTS FOR CAPTURING ACID AND GREENHOUSE GASES

(71) Applicant: Anuj K Saha, Martinez, GA (US)

(72) Inventor: Anuj K Saha, Martinez, GA (US)

( * ) Notice: Subject to any disclaimer, the term of this patent is extended or adjusted under 35 U.S.C. 154(b) by 0 days.

(21) Appl. No.: 16/375,800

(22) Filed: Apr. 4, 2019

(51) Int. Cl.

| | |
|---|---|
| ***B01D 53/02*** | (2006.01) |
| ***B01J 20/08*** | (2006.01) |
| ***B01D 53/50*** | (2006.01) |
| ***B01D 53/56*** | (2006.01) |
| ***B01D 53/62*** | (2006.01) |
| ***B01D 53/82*** | (2006.01) |
| ***B01J 20/04*** | (2006.01) |
| ***B01J 20/30*** | (2006.01) |
| ***B01J 20/16*** | (2006.01) |
| ***C01B 21/02*** | (2006.01) |
| ***C01B 13/02*** | (2006.01) |
| ***C01B 17/02*** | (2006.01) |
| ***B01D 53/52*** | (2006.01) |

(52) U.S. Cl.
CPC ............ *B01J 20/08* (2013.01); *B01D 53/508* (2013.01); *B01D 53/52* (2013.01); *B01D 53/565* (2013.01); *B01D 53/62* (2013.01); *B01D 53/82* (2013.01); *B01J 20/043* (2013.01); *B01J 20/165* (2013.01); *B01J 20/3007* (2013.01); *B01J 20/3078* (2013.01); *C01B 13/0203* (2013.01); *C01B 17/02* (2013.01); *C01B 21/02* (2013.01); *B01D 2251/304* (2013.01); *B01D 2251/402* (2013.01); *B01D 2251/404* (2013.01); *B01D 2257/302* (2013.01); *B01D 2257/304* (2013.01); *B01D 2257/404* (2013.01); *B01D 2257/502* (2013.01); *B01D 2257/504* (2013.01)

(58) Field of Classification Search
CPC .......... B01D 53/1475; B01D 2257/504; B01D 53/62; Y02C 10/06; Y02C 10/08
See application file for complete search history.

(56) References Cited

U.S. PATENT DOCUMENTS 3,580,702 A * 5/1971 Myers et al. .......... B01D 53/02 423/244.06
3,948,809 A * 4/1976 Norman .................. C01B 17/60 502/415

(Continued)

*Primary Examiner* — Christopher P Jones
(74) *Attorney, Agent, or Firm* — RB Consulting Inc.; James Carson

(57) ABSTRACT

The novel sorbents for capturing acid and greenhouse gases converts red mud into a sorbent material that can be used to remove acid and greenhouse gases, utilizing a series of chemical reactions. The first set of reactions entail sorption of the acid/greenhouse gases and subsequent neutralization by the alkali content of the red mud. The salts generated by the neutralization reactions decompose to release the acid gases which are immediately converted to environmentally benign elemental products (N2, O2, S) by thermo-catalytic reactions. In a different set of reactions, the alkaline earth oxides (CaO and MgO) present in the sorbent capture the acid/greenhouse gases and convert them to nitrate, nitrite, carbonate and sulfite salts. The salts (beside carbonate) decompose to yield the acid gases which are converted to elemental products by thermo-catalytic reactions. The loaded sorbents are thermally regenerated to the oxide forms for re-capturing the gases.

7 Claims, 2 Drawing Sheets

SCHEMATIC FOR CAPTURING ACID AND GREENHOUSE GASES FROM INDUSTRIAL BOILER FLUE STREAMS

(56) References Cited

U.S. PATENT DOCUMENTS

| | | | | | |
|---|---|---|---|---|---|
| 4,017,425 | A * | 4/1977 | Shiao | B01J 20/06 | 252/184 |
| 4,019,982 | A * | 4/1977 | Ikari | B01J 20/06 | 210/670 |
| 4,341,745 | A * | 7/1982 | Zopff | B01D 53/40 | 252/191 |
| 5,223,237 | A * | 6/1993 | Simpson | B01D 53/02 | 423/244.11 |
| 5,931,772 | A * | 8/1999 | Kirkpatrick | B01J 20/08 | 405/129.3 |
| 2019/0030455 | A1 * | 1/2019 | Ren | B01D 15/08 | |

* cited by examiner

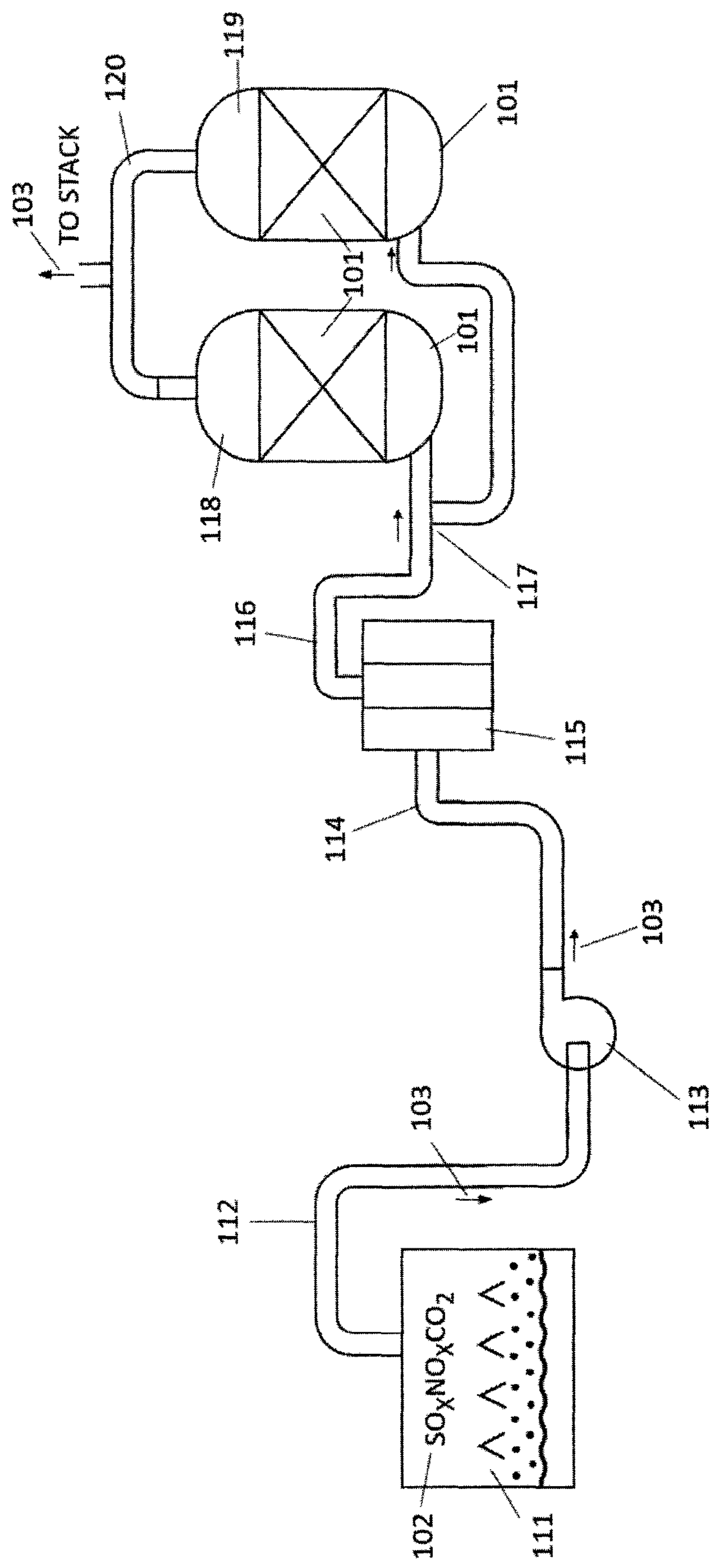
FIGURE – 1: SCHEMATIC FOR CAPTURING ACID AND GREENHOUSE GASES FROM INDUSTRIAL BOILER FLUE STREAMS

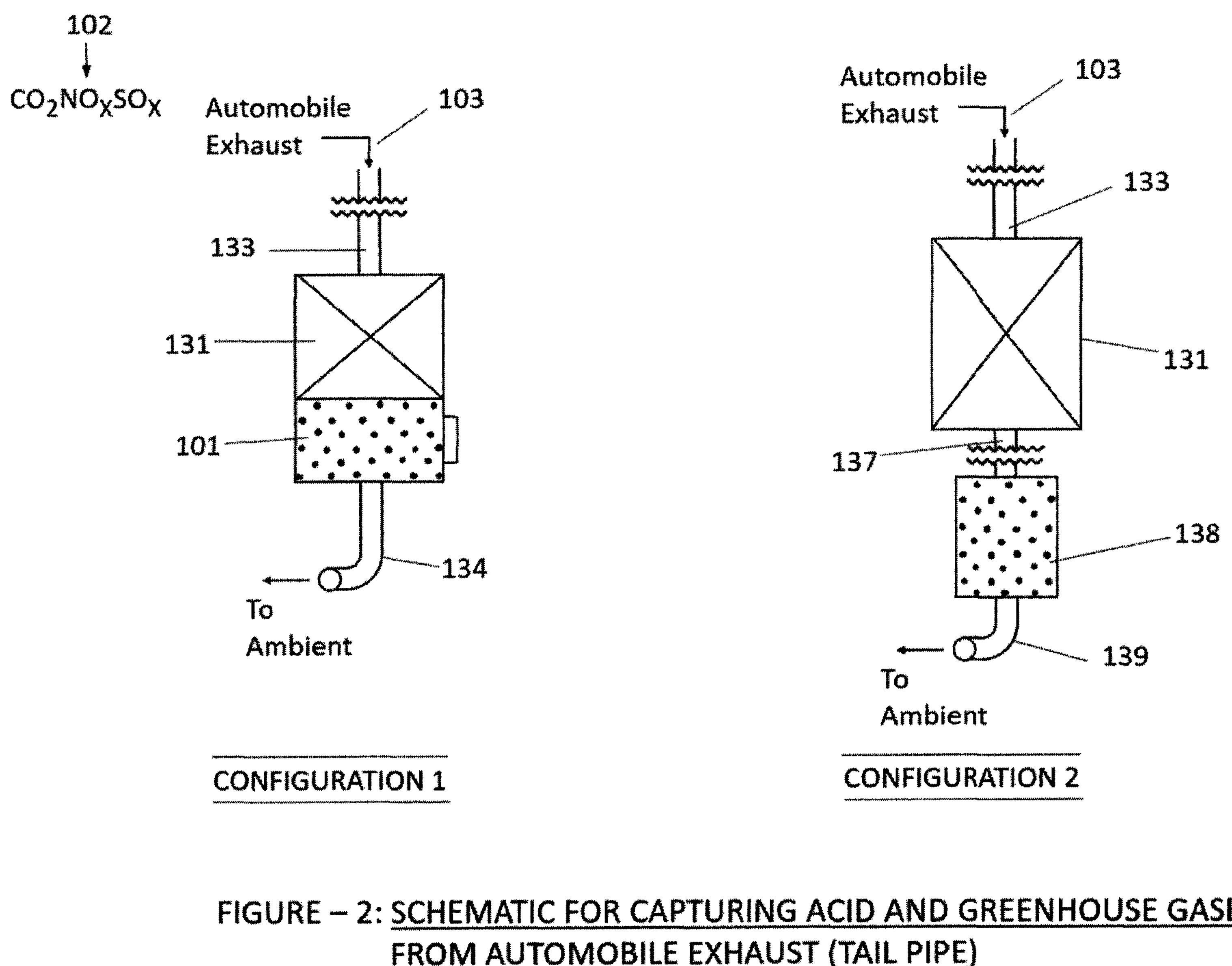
FIGURE – 2: SCHEMATIC FOR CAPTURING ACID AND GREENHOUSE GASES FROM AUTOMOBILE EXHAUST (TAIL PIPE)

SORBENTS FOR CAPTURING ACID AND GREENHOUSE GASES

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

The present invention relates to the field of separating and mixing operations including chemical processes and apparatus, more specifically, a process of separating gases by sorption.

Red mud is an insoluble waste generated during extraction of alumina (Al2O3) from mineral bauxite using the Bayer process. Red mud is an environmentally hazardous substance. Red mud is highly alkaline with a PH range of 10 to 13. The worldwide annual production of red mud is between 60 to 120 million tons. This figure increases annually. Red mud is further contaminated with metals and metal salts including, but not limited to, $Fe_2O_3$, $Al_2O_3$, $SiO_2$, CaO, $V_2O_5$, $Sc_2O_3$, $TiO_2$, and $Na_2O$. Red mud also has a high concentration of NaOH. The proper disposal of red mud is estimated to represent 5% of the production costs of aluminum. Most of the aluminum refiners store the Red Mud sludge adjacent to the refinery, in open pit lagoons, to save money. Open pit storing of Red Mud sludges presents an immediate threat to the surrounding ecosystems.

Whenever feasible, the red mud is used as a construction material. Because the demand for red mud as a construction material is much less than the annual production, vast quantities of Red Mud only pile up in many countries of the world.

Clearly, a practical use for red mud would be of benefit to our society.

SUMMARY OF INVENTION

The novel sorbents for capturing acid and greenhouse gases presents a method to take advantage of the composition and characteristics of the red mud present a unique opportunity for converting it to novel engineered sorbents that can solve some of the pressing environmental issues of our earth. A waste material that is produced in abundance in many countries in the world can be beneficially utilized to solve environmental problems in a manner that is safe, cost-effective and environmentally benign. It sure is a step in the right direction in combating global climate change.

These together with additional objects, features and advantages of the novel sorbents for capturing acid and greenhouse gases will be readily apparent to those of ordinary skill in the art upon reading the following detailed description of the presently preferred, but nonetheless illustrative, embodiments when taken in conjunction with the accompanying drawings.

In this respect, before explaining the current embodiments of the novel sorbents for capturing acid and greenhouse gases in detail, it is to be understood that the novel sorbents for capturing acid and greenhouse gases is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the novel sorbents for capturing acid and greenhouse gases.

It is therefore important that the claims be regarded as including such equivalent construction insofar as they do not depart from the spirit and scope of the novel sorbents for capturing acid and greenhouse gases. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 1 is an in-use view of an embodiment of the disclosure.

FIG. 2 is an in-use view of an embodiment of the disclosure.

DETAILED DESCRIPTION OF THE EMBODIMENT

The following detailed description is merely exemplary in nature and is not intended to limit the described embodiments of the application and uses of the described embodiments. As used herein, the word “exemplary” or “illustrative” means “serving as an example, instance, or illustration.” Any implementation described herein as “exemplary” or “illustrative” is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 2.

The novel sorbents for capturing acid and greenhouse gases 100 (hereinafter invention) converts red mud into a sorbent material 101 that can be used to remove acid gases and greenhouse gases 102 from a gas stream 103. The term acid gas is defined elsewhere in this disclosure. The term greenhouse gas is defined elsewhere in this disclosure. Acid gases include, but are not limited to hydrogen sulfide, oxides of sulfur, and nitrous oxide. Greenhouse gases include, but are not limited to carbon monoxide, carbon dioxide, and nitrous oxide.

The invention 100 is a process that comprises: a) passing a gas stream 103 comprising one or more acid gases and greenhouse gases 102 over the sorbent material 101; b) sorbing the acid gases and greenhouse gases 102 to the sorbent material 101 such that the acid gases and greenhouse gases 102 are sequestered in the sorbent material 101 and permanently removed from the environment; and, c) over time, the sorbent material 101 will break down the sequestered acid gases and greenhouse gases 102 into environmentally friendly compounds The third step incorporates a plurality of chemical reactions, including hydrolysis reactions and catalyzed reactions, that generate solids such as nitrites, nitrates, sulfates and sulfites as products of the reactions with the acid gases and greenhouse gases 102. The third step also generates elemental components ($N_2$, $O_2$, and S) as products as products of the reactions with the acid gases and greenhouse gases 102.

The properties of the sorbent material 101 described above are derived directly from the red mud described in the background of this disclosure. The sorbent material 101 retains both the alkalinity and the metal and metal salt "contamination" of the red mud described in the background. The chemistry and composition provided by the red mud favors the sorption of the acid gases and greenhouse gases 102 to the sorbent material 101. As described above, the red mud comprises compounds that commonly include, but are not limited to, $Fe_2O_3$, $Al_2O_3$, $SiO_2$, CaO, $V_2O_5$, $Sc_2O_3$, $TiO_2$, and $Na_2O$. From this composition, the CaO and the $SiO_2$ form the primary mass matrix of the red mud within which the $Fe_2O_3$, the $Al_2O_3$, the $V_2O_5$, the $Sc_2O_3$, the $TiO_2$, and the $Na_2O$ are contained and distributed. The $Fe_2O_3$, the $Al_2O_3$, $Na_2O$, and the $SiO_2$ are the base matrix on which the acid gases and greenhouse gases 102 sorb as they pass over the sorbent material 101. The metals contained in the $V_2O_5$, the $Sc_2O_3$, and the $TiO_2$, are well-known catalysts that catalyze the sorbed acid gases and greenhouse gases 102 into environmentally benign elements. The high percentage of NaOH contained in the red mud provides an alkali environment able to donate hydroxyl radicals for neutralization reactions. These chemical reactions are described in greater detail elsewhere in this disclosure.

In the first potential embodiment of the disclosure, the sorbent material 101 is formed from the red mud described in this disclosure.

In a second potential embodiment of the disclosure, the red mud that forms the sorbent material 101 is further enhanced with one or more natural minerals selected from the group consisting of limestone (calcium carbonate ($CaCO_3$)), magnesite (magnesium carbonate ($MgCO_3$)), and dolomite (calcium magnesium carbonate ($CaMgCO_3$)). In the second potential embodiment of the disclosure, the reactants provided by the limestone, the magnesite and the dolomite chemically react with the acid gases and greenhouse gases 102 after sorption onto the sorbents (the $Fe_2O_3$, the $Al_2O_3$, and the $Na_2O$) contained within the red mud that forms the basis of the sorbent material 101. These chemical reactions are described in greater detail elsewhere in this disclosure.

In a third potential embodiment of the disclosure, the red mud and one or more natural minerals selected from the group consisting of limestone, magnesite, and dolomite are impregnated into a natural zeolite material selected from the group consisting of Offretite and Mordenite. The chemistry of this scenario is similar to the chemistry described in the second potential embodiment of the disclosure. The third potential embodiment of the disclosure further allows the sorbent material 101 to capture vapor phase toxic metals, such as Mercury and Arsenic, that are commonly found in the exhaust gas stream 103 of fossil fuel combustion reactions.

In the first potential embodiment of the disclosure, the formation of the basic sorbent material 101 comprises forming the red mud into a pellet with a format selected from the group consisting of 1 mm diameter spheres and 1 mm pellets. The formation of the sorbent material 101 comprises a fabrication method selected from the group consisting of: a) compressing the red mud into a pellet with a format selected from the group consisting of spheres and pellets; and, b) extruding the red mud into a pellet with a format selected from the group consisting of spheres and pellets.

The fabricated sorbents are then air dried to prevent clumping followed by baking or roasting. The air-dried sorbent material 101 is baked at a temperature range of 650 C to 825 C for a period of greater than 2 hours to form sorbent material 101 pellets. The applicant prefers that the pellet format is formed using an extrusion process with natural adhesive like "Guar Gum".

In the second potential embodiment of the disclosure, the formation of the enhanced sorbent material 101 comprises mixing a moisten dose of the red mud with a natural mineral compound selected from the group consisting of: a) limestone; b) magnesite; c) dolomite; d) a mixture of limestone and magnesite; e) a mixture of limestone and dolomite; f) a mixture of dolomite and magnesite; and, g) a mixture of limestone, dolomite, and magnesite. The moistened red mud and the natural mineral are mixed in gravimetric proportions.

After mixing the enhanced sorbent material 101 of the second potential embodiment of the disclosure, the formation of the sorbent material 101 comprises forming the sorbent material 101 pellets with a format selected from the group consisting of 1 mm diameter spheres and 1 mm pellets. The formation of the sorbent material 101 comprises a fabrication method selected from the group consisting of: a) compressing the red mud into a pellet with a format selected from the group consisting of spheres and pellets; and, b) extruding the red mud into a pellet with a format selected from the group consisting of spheres and pellets. The fabricated pellets are then air dried to prevent clumping followed by baking. The air-dried pellets are baked at a temperature in the range of 650 C to 825 C for a period of greater than 2 hours to form sorbent material 101 pellets. A temperature of close to 650 C is required for dolomite and magnesite while limestone will require of roughly 825 C. The applicant prefers that the pellet format be formed using an extrusion process with natural adhesives like "Guar Gum'.

The above processes convert the selected natural mineral compounds into the following reactants used by the chemical reactions of the second potential embodiment of the disclosure described above: a) CaO from the limestone and the dolomite; and, b) MgO from the magnesite and the dolomite.

In the third potential embodiment of the disclosure, the formation of the enhanced sorbent material 101 comprises mixing a moisten dose of the red mud with a natural mineral compound selected from the group consisting of: a) limestone; b) magnesite; c) dolomite; d) a mixture of limestone and magnesite; e) a mixture of limestone and dolomite; f) a mixture of dolomite and magnesite; and, g) a mixture of limestone, dolomite, and magnesite. The combination of the moistened red mud and the natural mineral are mixed in a gravimetric proportion of a ratio of between 99% red mud and 1% selected natural mineral compound and 20% red mud and 80% selected natural mineral compound. The enhanced sorbent material 101 is formed such that the particulates in the enhanced sorbent material 101 have an average size of 200 to 300 mesh. The enhanced sorbent material 101 is placed in an inclined pressure tumbler with a natural zeolite structure selected from the group consisting of Offretite and Mordenite. The selected natural zeolite structure is formed such that the particulates in the enhanced sorbent material 101 have an average size of 20 to 30 mesh.

The contents in the tumbler are pressurized with an inert gas and tumbled for one or more hours to cause sintering-diffusion of the powders within the natural zeolite pores. Typical pressure range used for sintering the minerals to natural zeolite matrices is 100 to 300 psig. Following the pressure sintering, the reactor contents are heated with an inert fluid in the temperature range of 650 C to 825 C. The heating causes the carbonate minerals (limestone, dolomite, and magnesite) to decompose and stabilize in their oxide forms (CaO and MgO). The alkalinity of the red mud remains unaffected. Besides inclined tumbler reactor, a fluidized bed reactor configuration can also be used for sintering the red mud and the minerals to the natural zeolite matrices.

After the sintered material of the third potential embodiment of the disclosure is formed, the formation of the sorbent material 101 comprises forming the sorbent material 101 pellets with a format selected from the group consisting of 1 mm diameter spheres and 1 mm cubes. The formation of the sorbent material 101 comprises a fabrication method selected from the group consisting of: a) compressing the red mud into a pellet with a format selected from the group consisting of spheres and pellets; and, b) extruding the red mud into a pellet with a format selected from the group consisting of spheres and pellets. The fabricated pellets are then air dried to prevent clumping followed by baking. The air-dried pellets are baked at a temperature of greater than 600 C for a period of greater than 2 hours to form sorbent material 101 pellets. The applicant prefers that the pellet format is formed using an extrusion process.

The following three chemical reactions are selected and presented to represent the chemical reactions of the first potential embodiment of the disclosure used to capture and neutralize the acid gases and greenhouse gases 102 flowing through the invention 100 in the gas stream 103. These chemical reactions will also occur in the second and third potential embodiments of the disclosure.

2NaOH (alkali in Red Mud)+SO2=Na2SO3+H2O — Reaction 1:

4NaOH (alkali in Red Mud)+4NO+3O2=4NaNO3+2H2O — Reaction 2:

2NaOH (alkali in Red Mud)+CO2=Na2CO3+H2O — Reaction 3:

The following six chemical reactions are selected and presented to represent the catalyzed chemical reactions of the first potential embodiment of the disclosure used to capture and neutralize the acid gases and greenhouse gases 102 flowing through the invention 100 in the gas stream 103. These chemical reactions will also occur in the second and third potential embodiments of the disclosure.

Na2SO3+H2O=SO2+2NaOH — Reaction 4:

4NaNO3+2H2O=4NaOH+4NO+3O2 — Reaction 5:

2NaNO3=Na2O+2NO2+½O2 — Reaction 6:

SO2 (from decomposition of Na2SO3, Reaction 4)+V, SC, or Ti Catalyst=Elemental S+O2+Catalyst — Reaction 7:

2NO2 (from decomposition of NaNO3, Reaction 6)+V, SC, or Ti Catalyst=N2+2O2+Catalyst — Reaction 8:

2NO (from decomposition of NaNO3, Reaction 5)+V, SC, or Ti Catalyst=N2+O2+Catalyst — Reaction 9:

The following six chemical reactions are selected and presented to represent the catalyzed chemical reactions of the first potential embodiment of the disclosure used to capture and neutralize the acid gases and greenhouse gases 102 flowing through the invention 100 in the gas stream 103. These chemical reactions will also occur in the third potential embodiment of the disclosure.

CaO+CO2=CaCO3 — Reaction 10:

MgO+CO2=MgCO3 — Reaction 11:

CaO+SO2=CaSO3 — Reaction 12:

MgO+SO2=MgSO3 — Reaction 13:

CaO+2NO+3/2O2=Ca(NO3)2 — Reaction 14:

MgO+2NO+3/2O2=Mg(NO3)2 — Reaction 15:

The chemical reactions described by reactions 10 through 15 consume the reactants contained in the sorbent material 101 pellets created in the second and third potential embodiments of the disclosure. The applicant also notes that reactions 10 through 15 are reversible and that therefore the reactants can be regenerated by the application of heat to the sorbent material 101 pellets. Specifically, the sorbent material 101 pellets selected from the group consisting of the second potential embodiment of the disclosure and third potential embodiment reversible reactions are reversed by exposing the selected sorbent material 101 pellets to a temperature of greater than 600 C (650 C to 825 C) for a period of greater than 2 hours. The following three chemical reactions describe the thermal regeneration chemistry presented in this paragraph.

CaCO3 (Limestone)=CaO+CO2 — Reaction 16:

MgCO3 (Magnesite)=MgO+CO2 — Reaction 17:

2CaMg(CO3)2 (Dolomite)=2CaO+2MgO+4CO2 — Reaction 18:

Two illustrations are described below for beneficial commercial application of a sorbent material 101 selected from the group consisting of: a) the first potential embodiment of the disclosure; b) the second potential embodiment of the disclosure; and, c) the third potential embodiment of the disclosure. In each illustration, the selected sorbent material 101 captures acid gases and greenhouse gases 102 that are attributed to the warming of the global climate.

The first illustration involves the treatment of industrial boiler 111 flue gas stream 103.

FIG. 1 shows a schematic for capturing acid gases and greenhouse gases 102 from an industrial gas stream 103. An industrial boiler 111 burning fossil fuels generates the flue gas stream 103 containing the acid gases and greenhouse gases 102. The acid gases contained in the acid gases and greenhouse gases 102 include, but are not limited to, SOx and NOx. The greenhouse gases contained in the acid gases and greenhouse gases 102 include, but are not limited to, CO2. The flue gas stream 103 is carried by a first ductwork 112 to the suction side of a blower 113. The discharge of blower 113 is carried by second ductwork 114 and is pushed through a high-temperature ceramic filter (HTCF) 115 to remove the particulates/fly ashes. The particulate flue gas stream 103 is carried by third ductwork 116 to the bottom of a first neutralizer/sorber 118. A fourth ductwork 117 carries the particulate free fly ash to the bottom of another a second neutralizer/sorber 119. Both the first neutralizer/sorber 118 and the second neutralizer/sorber 119 are filled with a sorbent material 101 selected from the group consisting of the first potential embodiment of the disclosure, the second potential embodiment of the disclosure and the third potential embodiment of the disclosure. The first neutralizer/sorber 118 captures the acid gases and the greenhouse gases 102 from the flue gas stream 103. The second neutralizer/sorber 119 captures the acid gases and the greenhouse gases 102 from the flue gas stream 103. The treated flue gas exits the first neutralizer/sorber 118 via a fifth ductwork 120 to a stack. The treated flue gas exits the second neutralizer/sorber 119 via the fifth ductwork 120 to a stack.

Both the first neutralizer/sorber 118 and the second neutralizer/sorber 119 are identical in design, construction, and operation. At any given time, only one neutralizer/sorber selected from the group consisting of the first neutralizer/sorber 118 and the second neutralizer/sorber 119 will be operational. The remaining neutralizer/sorber will remain as a standby. The spent selected sorbent material 101 is removed from the standby neutralizer/sorber and sent to a regeneration facility for the thermal regeneration processes described in reactions 16 through 18.

The second illustration involves the treatment of automobile tail pipe exhaust gas stream 103:

FIG. 2 shows a schematic for capturing the acid gases and the greenhouse gases 102 from the gas stream 103 through an automobile tail pipe exhaust. The automobile exhaust gas stream 103 from gasoline and diesel fuel powered vehicles emits significant amount of acid gases and the greenhouse gases 102. The catalytic convertors used for vehicle emission control get deposited with carbon soot and loses its effectiveness rapidly.

FIG. 2 shows a first configuration and a second configuration for the use of the selected sorbent material 101 in the treatment of a gas stream 103 of an automobile emission. In the first configuration, the selected sorbent material 101 is removably inserted into the end of a muffler 131, as a single package. An exhaust gas stream 103 enters the muffler 131 via a gas stream 103 feed 133 and passes through the selected sorbent material 101. The treated air is discharged via tail pipe 134.

In the second configuration, a sorbent module 138 module containing the selected sorbent material 101 is attached to the muffler 131 using a quick connect pipe 137. The automobile exhaust gas stream 103 enters the muffler 131 via a gas stream 103 feed pipe 133 and pass onto the sorbent module 138. The treated gas stream 103 is discharged via a discharge pipe segment 139.

Depending on the characteristics of the fuel, the regeneration frequency of the selected sorbent material 101 can be pre-determined. Regeneration can be achieved in certified regeneration centers equipped with proper equipment.

The following definitions were used in this disclosure:

Acid Gas: As used in this disclosure, an acid gas is a molecule in a gas phase that dissolves in water to form an acid.

Adsorbtion: As used in this disclosure, adsorbtion refers to the formation of a layer of molecules on a surface.

Bulk Solid: As used in this disclosure, a bulk solid is a material that is formed from an accumulation of discrete particles. While the discrete particles of the bulk solid are solid materials, in aggregate the physical performance of bulk solid will exhibit fluid characteristics such as flow or taking the shape of a container.

Combustion: As used in this disclosure, combustion refers to a reduction-oxidation reaction wherein oxygen and a hydrocarbon are combined to release energy, carbon dioxide, and water. In general usage, the meaning of combustion is often extended to describe a reaction between oxygen and a fuel source, such as a hydrocarbon modified by functional groups, which releases energy.

Flow: As used in this disclosure, a flow refers to the passage of a fluid past a fixed point. This definition considers bulk solid materials as capable of flow.

Fluid: As used in this disclosure, a fluid refers to a state of matter wherein the matter is capable of flow and takes the shape of a container it is placed within. The term fluid commonly refers to a liquid or a gas.

Gas: As used in this disclosure, a gas refers to a state (phase) of matter that is fluid and that fills the volume of the structure that contains it. Stated differently, the volume of a gas always equals the volume of its container.

Greenhouse Gas: As used in this disclosure, a greenhouse gas refers to a molecule in a gas phase that absorbs infrared radiation.

Hydrolysis: As used in this disclosure, hydrolysis refers to the chemical decomposition of a material through a reaction with water.

Liquid: As used in this disclosure, a liquid refers to a state (phase) of matter that is fluid and that maintains, for a given pressure, a fixed volume that is independent of the volume of the container.

Solid: As used in this disclosure, a solid refers to a state (phase) of matter that: 1) has a fixed volume; and, 2) does not flow.

Mesh: As used in this disclosure, the term mesh refers to a measure of the size of particle a screen or sieve will pass. Specifically, mesh refers to the number of holes per linear inch of the screen or sieve surface. For example, a sieve surface with ten holes per linear inch is referred to as 10 mesh. A ten mesh screen or sieve surface will have on average 100 holes per square inch.

Metal: As used in this disclosure, a metal is an element that readily loses electrons or an alloy formed from a plurality of such elements. General properties of metals include, but are not limited to, the ability to conduct electricity, malleability, and the ability to be drawn into a wire. For the purposes of this disclosure, the term metal refers to elements in columns 1-12 of the periodic table and aluminum, tin, and lead.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

Pellet: As used in this disclosure, a pellet refers to an object formed in a prism shape.

Phase: As used in this disclosure, phase refers to the state of the form of matter. The common states of matter are solid, liquid, gas, and plasma.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Roughly: As used in this disclosure, roughly refers to a comparison between two objects. Roughly means that the difference between one or more parameters of the two compared are not significantly different.

Reduction-Oxidation Reaction: As used in this disclosure, a reduction-oxidation reaction (also known as a redox reaction) is a chemical reaction involving the transfer of electrons between the reactants of the reaction.

Salt: As used in this disclosure, a salt means an ionic compound that further comprises at least one atom of a metallic element or compound and one atom of a non-metallic element or compound. When dissolved in water, the ionic compound releases the metallic element and the non-metallic element into the water as ions. In this disclosure, a metallic element is assumed to include the alkali metals and the alkali earth metals. Alternatively, and equivalently, a metallic element may be assumed to be any element on the periodic table that is to the left of the metalloids.

Sinter: As used in this disclosure, the term sinter means to convert a bulk solid material into a solid phase material.

Zeolite: As used in this disclosure, a zeolite is any of a group compounds that are used as molecular filters and ion exchange agents.

With respect to the above description, it is to be realized that the optimum dimensional relationship for the various components of the invention described above and in FIGS. 1 through 2 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A sorbent structure for capturing acid gases and greenhouse gases comprising a sorbent material;

wherein the sorbent structure for capturing acid gases and greenhouse gases passes a gas stream comprising one or more acid gases and greenhouse gases over a sorbent material;

wherein the sorbent structure for capturing acid gases and greenhouse gases sorbs the acid gases and greenhouse gases to the sorbent material such that the acid gases and greenhouse gases are sequestered within the sorbent material;

wherein the sorbent material catalytically breaks down the sequestered acid gases and greenhouse gases;

wherein the sorbent material comprises a red mud;

wherein the sorbent structure for capturing acid gases and greenhouse gases removes acid gases and greenhouse gases from the gas stream;

wherein the acid gases comprise hydrogen sulfide, oxides of sulfur, and nitrous oxide;

wherein greenhouse gases comprise carbon monoxide, carbon dioxide, and nitric oxide;

wherein the gas stream further comprises one or more heavy metals from the gas stream;

wherein the sorbent material removes the one or more heavy metals from the gas stream;

wherein the one or more heavy metals are selected from the ground consisting of mercury and arsenic;

wherein the red mud comprises the compounds $Fe_2O_3$, $Al_2O_3$, $SiO_2$, CaO, $V_2O_5$, $Sc_2O_3$, and $Na_2O$;

wherein the CaO and the $SiO_2$ forms the primary mass matrix of the red mud within which the $Fe_2O_3$, the $Al_2O_3$, the $V_2O_5$, the $Sc_2O_3$, and the $Na_2O$ are contained and distributed;

wherein the $Fe_2O_3$, the $Al_2O_3$, $Na_2O$, and the $SiO_2$ are a base matrix on which the acid gases and greenhouse gases sorb as they pass over the sorbent material;

wherein the metals contained in the $V_2O_5$ and the $Sc_2O_3$ catalyze the sorbed acid gases and greenhouse gases into environmentally benign materials;

wherein the sorbent structure for capturing greenhouse gases generates elemental components (N2, O2, and S) as products of catalyzed reactions with the acid gases and greenhouse gases;

wherein the sorbent material further comprises one or more natural minerals, and a natural zeolite material;

wherein the one or more natural minerals are selected from the group consisting of limestone (calcium carbonate (CaCO3)), magnesite (magnesium carbonate (MgCO3)), and dolomite (calcium magnesium carbonate (CaMgCO3));

wherein the natural zeolite material is selected from the group consisting of Offretite and Mordenite;

wherein the reactants provided by the limestone, the magnesite, and the dolomite chemically react with the acid gases and greenhouse gases after sorption onto the sorbents (the $Fe_2O_3$, the $Al_2O_3$, and the $Na_2O$) contained within the red mud that forms the basis of the sorbent material;

wherein the natural zeolite material captures the one or more heavy metals in a vapor phase from the gas stream;

wherein a mixture of the red mud and the one or more natural minerals are sintered within the pore structures of the natural zeolite material.

2. The sorbent structure for capturing acid gases and greenhouse gases according to claim 1 wherein a combination of the red mud and the natural mineral compound are mixed in a ratio of between 99% red mud and 1% selected natural mineral compound and 20% red mud and 80% selected natural mineral compound.

3. The sorbent structure for capturing acid gases and greenhouse gases according to claim 2 wherein the red mud and the natural mineral compound are mixed with the natural zeolite material in an inclined pressure tumbler with a pressurized inert gas;

wherein the pressure range is 100 to 300 PSIG.

4. The sorbent structure for capturing acid gases and greenhouse gases according to claim 3 wherein the red mud, the natural mineral compound, and the natural zeolite material in the tumbler are tumbled in the pressurized inert gas for one or more hours to cause sintering-diffusion of the red mud and the mineral powders within the natural zeolite pores.

5. The sorbent structure for capturing acid gases and greenhouse gases according to claim 4 wherein the basic sorbent material is formed using a fabrication method selected from the group consisting of: a) compressing the red mud into a pellet with a format selected from the group consisting of spheres and pellets; and, b) extruding the red mud into a pellet with a format selected from the group consisting of spheres and pellets;

wherein the sorbent material is air dried after fabrication;

wherein the air-dried fabricated sorbent material is baked at a temperature range of 650 C to 825 C for a period of greater than 2 hours.

6. The sorbent structure for capturing acid gases and greenhouse gases according to claim 5 wherein the sorbent material pellets contain CaO when the selected natural mineral contains limestone;

wherein the sorbent material pellets contain CaO when the selected natural mineral contains dolomite;

wherein the sorbent material pellets contain MgO when the selected natural mineral contains dolomite;

wherein the sorbent material pellets contain MgO when the selected natural mineral contains magnesite.

7. The sorbent structure for capturing acid gases and greenhouse gases according to claim 6 wherein the sorbent material is formed such that the particulates in the enhanced sorbent material have an average size of 200 to 300 mesh;

wherein the selected natural zeolite structure is formed such that the particulates in the enhanced sorbent material have an average size of 20 to 30 mesh.

* * * * *